Figure 1:
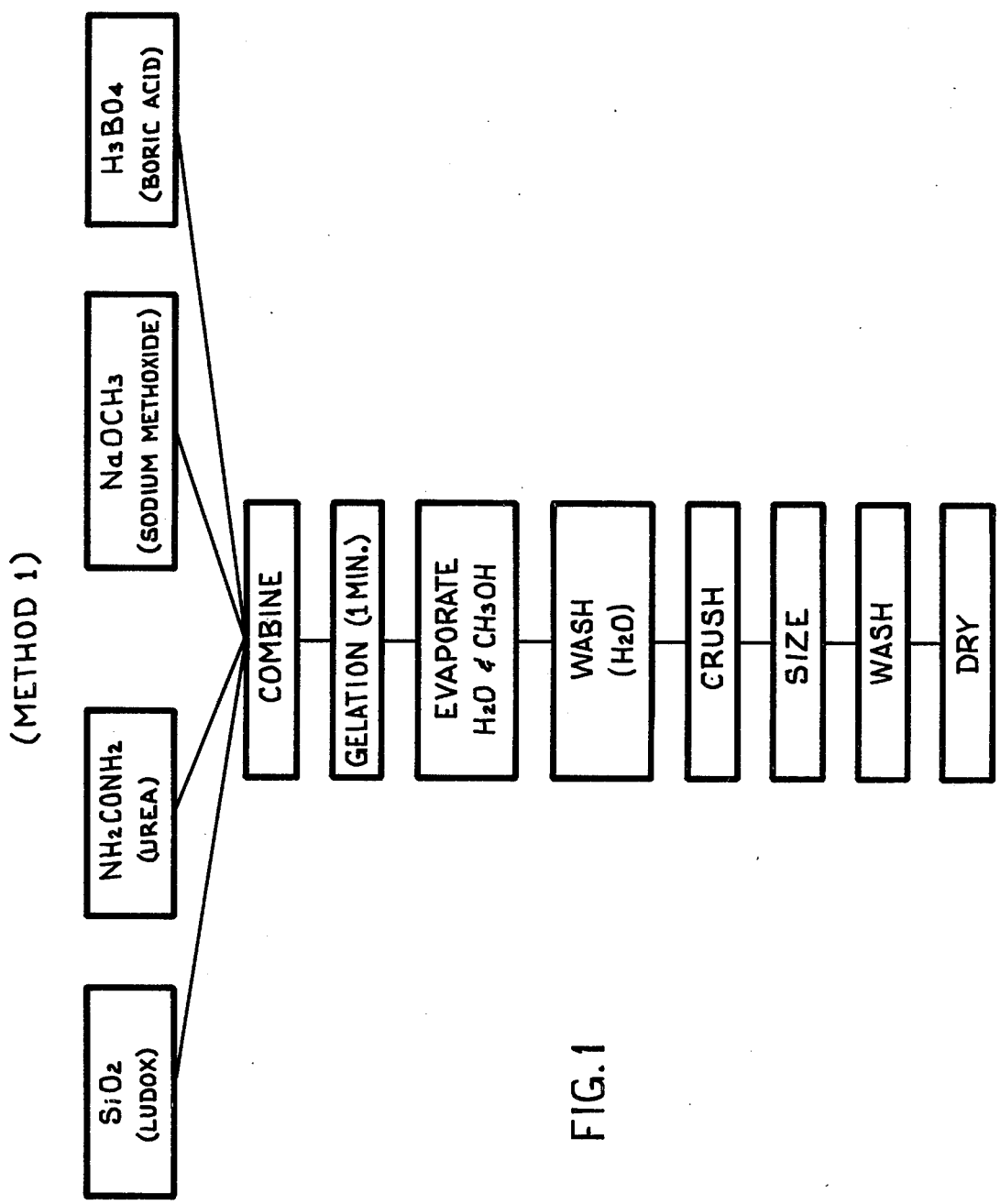

United States Patent [19]

Budrick et al.

[11] 4,021,253

[45] May 3, 1977

[54] METHOD FOR MANUFACTURING GLASS FRIT

[75] Inventors: Ronald G. Budrick, Ann Arbor, Mich.; Frank T. King, Hillsboro, Oreg.; Robert L. Nolen, Jr.; David E. Solomon, both of Ann Arbor, Mich.

[73] Assignee: KMS Fusion, Inc., Ann Arbor, Mich.

[22] Filed: Apr. 5, 1974

[21] Appl. No.: 463,892

[52] U.S. Cl. ............................. 106/53; 106/47 R; 106/52; 106/54; 264/140
[51] Int. Cl.² ....................................... C03C 3/04
[58] Field of Search ............. 106/47 R, 52, 53, 54; 264/140

[56] References Cited

UNITED STATES PATENTS 3,865,747   2/1975   Greenberg ................ 252/301.1 R

*Primary Examiner*—Stephen J. Lechert, Jr.
*Attorney, Agent, or Firm*—Barnes, Kisselle, Raisch & Choate

[57] ABSTRACT

A method of manufacturing a glass frit for use in the manufacture of uniform glass microspheres to serve as containers for laser fusion fuel to be exposed to laser energy which includes the formation of a glass gel which is then dried, pulverized, and very accurately sized to particles in a range of, for example, 125 to 149 micrometers. The particles contain an occluded material such as urea which expands when heated. The sized particles are washed, dried, and subjected to heat to control the moisture content prior to being introduced into a system to form microspheres.

9 Claims, 2 Drawing Figures

METHOD FOR MANUFACTURING GLASS FRIT

This invention relates to a Method of Manufacturing Glass Frit which can be utilized for the making of pellets for use in a laser fusion process.

There is much work being done presently to achieve a fusion reaction by explosing a quantity of fusion fuel, as, for example, deuterium or deuterium-tritium to a pulsed laser beam. Patents which disclose this process in a general way are:

Whittlesey — U.S. Pat. No. 3,378,446 — 4/16/68
Daiber — U.S. Pat. NO. 3,489,645 — 1/13/70
Fraas — U.S. Pat. No. 3,624,239 — 11/30/71
Hedstrom — U.S. Pat. No. 3,762,992 — 10/02/73

In addition, there are a number of pending applications of Keith A. Brueckner which disclose such as a process. One such application bears Ser. No. 377,508 and filing date July 10, 1973.

The above patents disclose the use of a droplet of deuterium on a pellet under cryogenic temperatures so that it can be treated as a solid. These patents contemplate dropping the fuel into a reaction chamber and timing the laser to meet the droplet at about the center of the reaction chamber. Another patent application of Robert J. Teitel and David E. Solomon, Ser. No. 339,558, filed March 9, 1973, discloses a fuel configuration in the form of a hollow, glass microsphere which is filled with fusion fuel, such as deuterium or deuterium-tritium, by utilizing the permeability characteristics of the glass walls of the microsphere and causing the fuel in gaseous form to move through the walls to the interior of the sphere. Once the fuel is charged, the microspheres can be stored for long periods under suitable conditions until used in the fusion process.

While hollow microspheres are available in commercial quantities, the non-uniformity of size and wall thickness makes them undesirable for use in the fusion process. It is an object of the present invention to provide a glass frit which is suitable for manufacturing hollow glass microspheres of high and uniform quality. It is a further object to provide a method and composition for the manufacturing of glass frit which results in a uniform product.

Other objects and features of the invention will be apparent in the following description and claims wherein are set forth the principles of the invention together with the best mode presently contemplated for the practice of the invention.

Figure 2:
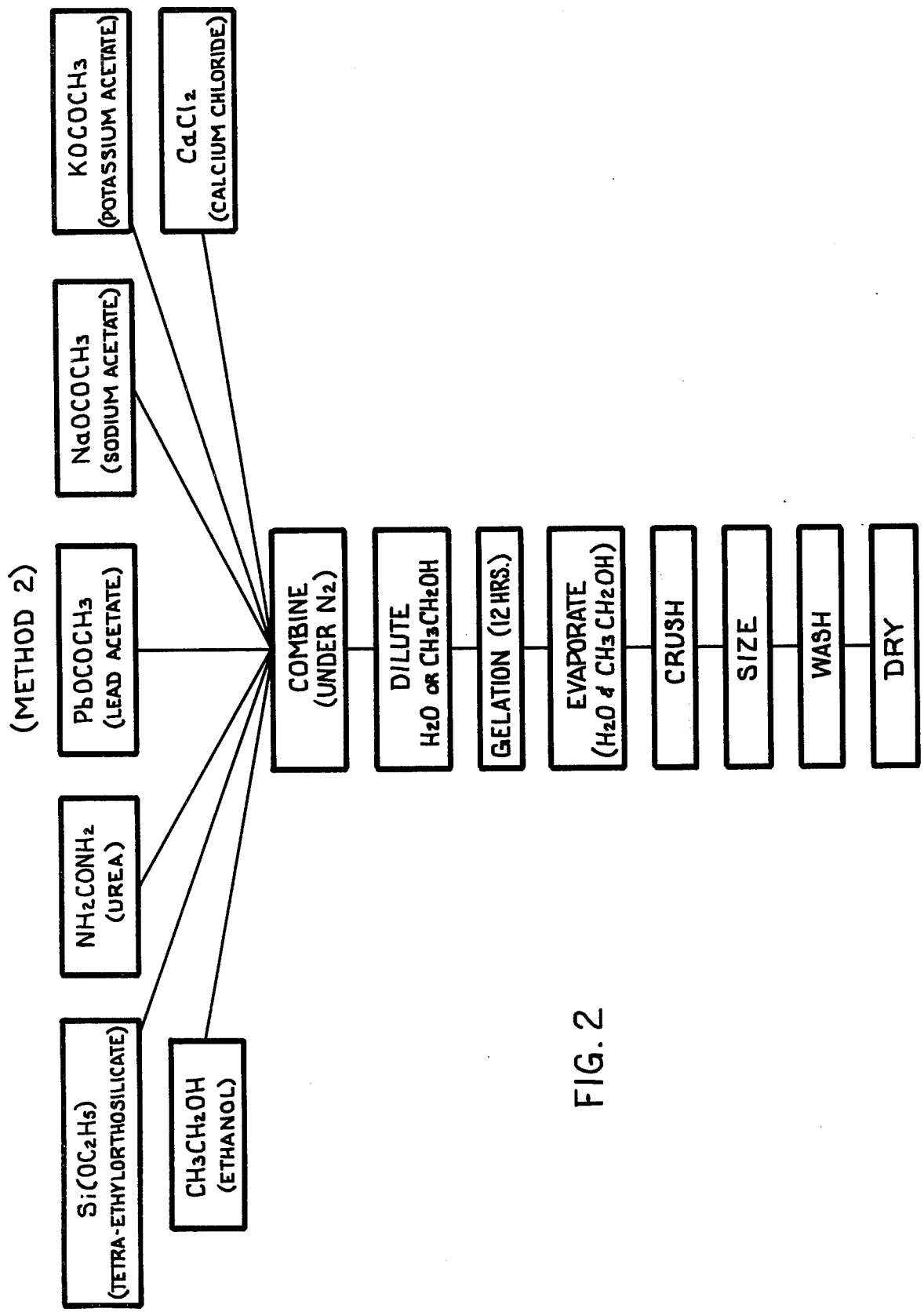

Drawings accompany the disclosure and the various views thereof may be briefly described as:

FIG. 1, a first flowchart illustrating a first method.
FIG. 2, a second flowchart illustrating a modified method.

Desirable microsphere specifications are as follows:

TABLE I

Ability to Withstand Thermal Cycle: 4° K – 600° K
Shear strength: > 100,00 psi
Tensile strength: > 1,000,000 psi
Resistance to abrasion: high
Permeability to hydrogen at 600° K: ~ $10^{-8}$
Permeability to hydrogen at 300° K: ~ $10^{-13}$
Permeability of hydrogen at 77° K: ~ $10^{-17}$
Reflectivity from 10 to 50 microns: high
Reflectivity at 1.06 microns: low
Absorptivity at 1.06 microns: high
Outside diameter: 100–400$\mu$m ± 1 $\mu$m
Wall thickness: 1–4% ±0.4$\mu$m of diameter
Wall uniformity: ±5%
Concentricity of ID and OD: ±10%
Sphericity: ±1%
Surface finish: < 2$\mu$m rms
Specific gravity: < 0.3

The present method contemplates the synthesis of glass which is, first of all, fuel of elements deleterious to the fusion reaction, and, second, ideally suited for blowing into microspheres having the desired characteristics set forth in Table I above. The gel glass technique is used in the process. This method is described by Helmut Dislich, mainly in a report dated May 27, 1970 delivered at the 44th Glass-Technical Meeting in Lindau, the title of the report being "The Preparation of Multi-Component Glasses Without Passing Through the Melt Phase".

According to the first example, the starting components are:

| | |
|---|---|
| $SiO_2$ | 53% by weight |
| $NaOCH_3$ (sodium methoxide) | 35% by weight |
| $H_3BO_4$ (boric acid) | 12% by weight |
| | 100% |

The quantities are weighed and mixed, the $SiO_2$ being in liquid (suspension) form. A quantity of urea ($NH_2CO\,NH_2$) equal to about 10% by weight of the mix is added. The mixture sets up in the form of a gel in about one minute which is then dried at about 100° C for 24 hours. This drives off water ($H_2O$) and methanol ($CH_3OH$). This period of time yields the most desirable residual water content for the blowing process. After drying the gel, it is in the form of a block which is washed in water, dried, and then crushed with a pestle in a steel mortar. This system has been found superior to the ball mill grinding process since the object is to obtain granular particles as distinguished from a talc.

The gel frit is then dry sieved to −100, +120 U.S. Standard Sieve size (125 micrometer to 149 micrometer particle size) and then placed back in a furnace at 90° C to maintain the same water content. Special multiple sieve sets having gradations as low as 5 micrometers are used in the sizing operation. These steps are diagrammed in FIG. 1. The resulting glass has a composition of $SiO_2$, 73% by weight, $Na_2O$, 20% and $B_2O_3$, 7%. The particular starting particle size is selected on the basis that, after determining a density of about 2.4 gm/cc and a mean size of 137 microns, it has a mean starting mass sufficient to yield a hollow glass sphere of the required dimension, as, for example, 200–300 microdiameter.

The sized frit material is washed in methanol to remove any fine powder that might be clinging to the particles. This will minimize the formation of bubbles in and on the walls of the resulting spheres. After this washing, the finished frit is oven dried at 100° C for two to four hours to obtain the desired water content before the introduction to the microsphere forming process (spheroidization).

In the modified second method, the starting materials might be:

| | | |
|---|---|---|
| $Si(OC_2H_5)$ | (tetra ethylorthosilicate) | 30% by weight |
| $PbO(CH_3)_2$ | (lead ethoxide) | 31% by weight |
| $NaOCH_3$ | (sodium methoxide) | 22% by weight |

| | -continued | |
|---|---|---|
| KOCH₃ | (potassium methoxide) | 14% by weight |
| CaCl₂ | (calcium chloride) | 3% by weight |
| | | 100% |

The ingredients above listed are mixed with 10% by weight of urea ($NH_2CONH_2$) and combined under a nitrogen atmosphere into a liquid mix and diluted with water or ethanol to facilitate gelation process. The diluted mixture is then allowed to gel over a period of about 12 hours and the water and ethanol allowed to evaporate leaving a solid block which is then crushed, sized, washed, and dried as previously described. The resulting glass has a composition of PbO: 21% by weight
$SiO_2$: 63% by weight
NaO; 8% by weight
CaO: 2% by weight
$K_2O$: 6% by weight The resulting frit from either Method 1 or Method 2 (or variations or combinations thereof) can then be subjected to the spheroidization or blowing process to produce hollow microspheres of the desired size. A process for forming the microspheres with desirable uniformity is described in a co-pending application of R. G. Budrick, F. T. King, A. J. Martin, R. L. Nolen, and D. E. Solomon, Ser. No. 463,860 filed Apr. 15, 1974.

What we claim is:

1. A method of manufacturing glass frit to serve as a raw material for the making of glass microspheres for use as laser fusion pellets which comprises:
    a. forming a glass gel containing an occluded material which expands upon heating,
    b. drying the gel at temperatures below the vaporization temperature of the occluded material to avoid driving off the occluded material and to form a block of dehydrated material,
    c. crushing the dehydrated block to form a glass frit,
    d. sieving the resulting glass frit to obtain a frit of a predetermined particle size,
    e. washing the sized frit in a volatile liquid, and
    f. drying the frit to control the moisture content.

2. A method of manufacturing glass frit to serve as a raw material for the making of glass microspheres for use as laser fusion pellets which comprises:
    a. forming a glass gel utilizing a mixture of silicon dioxide, sodium methoxide and boric acid mixed with urea,
    b. drying the gel at a temperature below the vaporization temperature of the urea to void driving off the occluded material and to form a block of dehydrated material,
    c. crushing the dehydrated block to form a glass frit,
    d. sieving the resulting glass frit to obtain a frit having a predetermined particle size,
    e. washing the sized frit in a volatile liquid, and
    f. drying the frit to control the moisture content.

3. A method as defined in claim 1 in which the glass is sieved to a frit ranging from 125 to 149 micrometer particle size.

4. A method as defined in claim 1 in which the glass has a composition by weight of about 73% $SiO_2$, 20% $Na_2O$, and 7% $B_2O_3$.

5. A method as defined in claim 1 which the sized frit is washed in methanol.

6. A method as defined in claim 2 in which the composition of the mix for forming the gel comprises tetra ethylorthosilicate, lead oxide, sodium methoxide, potassium methoxide and calcium chloride mixed with urea.

7. A method as defined in claim 6 in which the composition of the mix is by weight about:
    tetra ethylorthosilicate: 30%
    lead oxide: 31%
    sodium methoxide: 22%
    potassium methoxide: 14%
    Calcium chloride: 3%

8. A method as defined in claim 6 in which the resulting glass has a composition by weight of about:
    PbO: 21%
    $SiO_2$: 63%
    NaO: 8%
    CaO: 2%
    $K_2O$: 6%

9. A method as defined in claim 1 in which the sieving of the crushed gel is accomplished by a series of sieving steps utilizing sieve gradation of approximately 5 micrometers.

* * * * *

UNITED STATES PATENT OFFICE
CERTIFICATE OF CORRECTION

PATENT NO. : 4,021,253
DATED : May 3, 1977
INVENTOR(S) : Ronald G. Budrick et al It is certified that error appears in the above-identified patent and that said Letters Patent are hereby corrected as shown below:

Col. 2, line 22, change "fuel" to -- free --.

Col. 4, line 8, change "void" to -- avoid --.

Col. 4, line 24, change "2" to -- 1 --.

Signed and Sealed this twenty-third Day of August 1977

[SEAL]

Attest:

RUTH C. MASON
Attesting Officer

C. MARSHALL DANN
Commissioner of Patents and Trademarks

UNITED STATES PATENT AND TRADEMARK OFFICE
Certificate

Patent No. 4,021,253          Patented May 3, 1977

Ronald G. Budrick, Frank T. King, Alfred J. Martin, Robert L. Nolen and David E. Solomon Application having been made by Ronald G. Budrick, Frank T. King, Alfred J. Martin, Robert L. Nolen and David E. Solomon, the inventors named in the patent above identified, for the issuance of a certificate under the provisions of Title 35, Section 256, of the United States Code, adding the name of Richard G. Snell as a joint inventor, and a showing and proof of facts satisfying the requirements of the said section having been submitted, it is this 22nd day of May, 1984, certified that the name of the said Richard G. Snell is hereby added to the said patent as a joint inventor with the said Ronald G. Budrick, Frank T. King, Alfred J. Martin, Robert L. Nolen and David E. Solomon.

Fred W. Sherling,
*Associate Solicitor.*